July 10, 1956 J. J. PATERNO 2,753,648
FISH LURES
Filed June 12, 1953
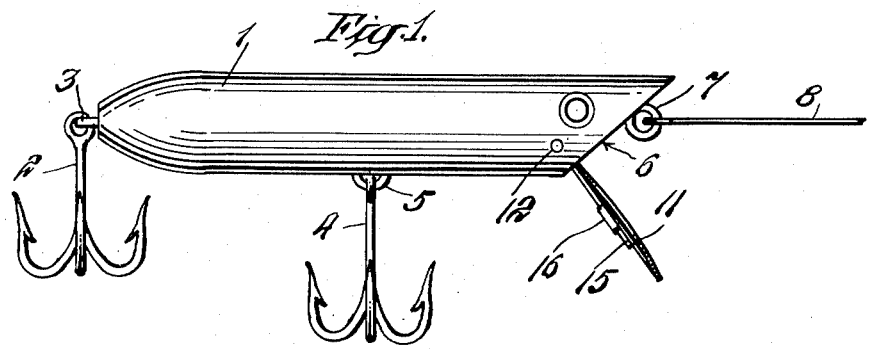
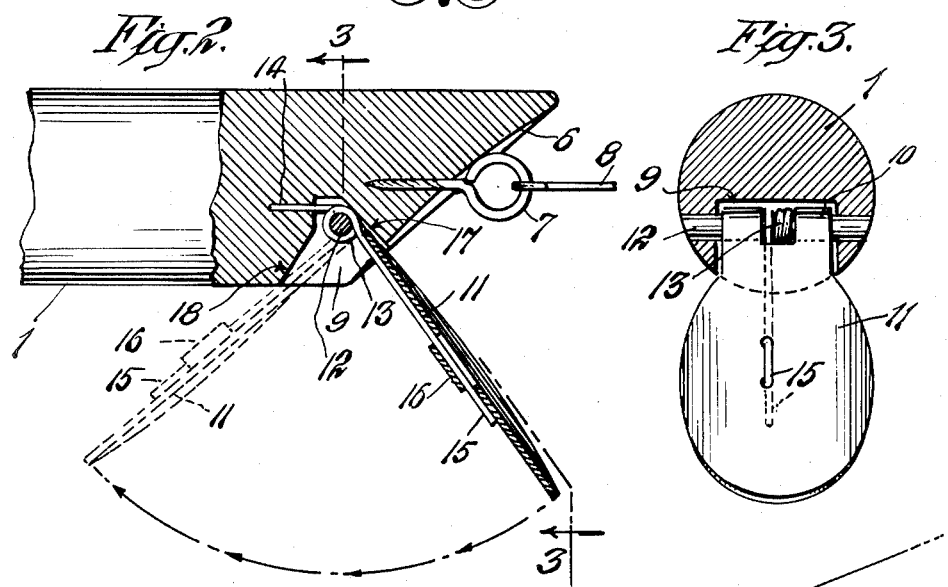
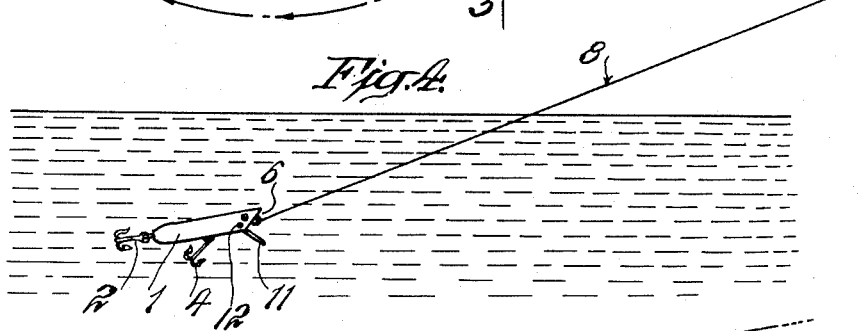
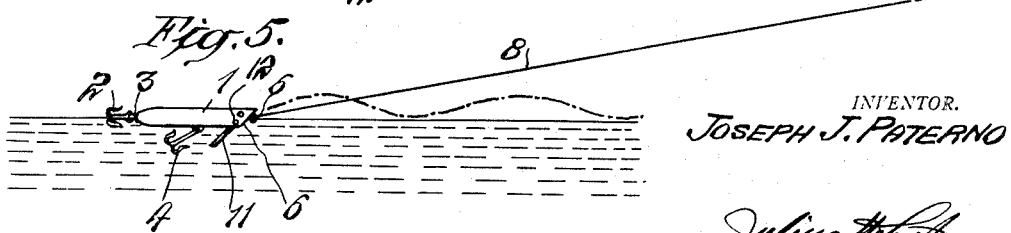
INVENTOR.
JOSEPH J. PATERNO
BY
ATTORNEY United States Patent Office 2,753,648
Patented July 10, 1956

2,753,648

FISH LURES

Joseph J. Paterno, Bergenfield, N. J.

Application June 12, 1953, Serial No. 361,148

1 Claim. (Cl. 43—42.03)

This invention relates to fish lures, and has for one of its objects, the provision of a construction embodied in an article of this character by means of which life-like darting movements of the lure will be obtained to thereby attract the fish.

It is another object of the invention to provide means by which elevation of the lure or bait toward the surface of the water can be controlled, and by which a skipping movement of the lure over the surface of the water is attained when desired.

More particularly, the invention contemplates the provision of a lure or bait having a body formed at the front with an inclined surface, and having a pivoted, spring-pressed vane or plate operative in conjunction with such surface to cause elevation of the lure while in the water and under predetermined pull therethrough, while also causing a skipping or jumping action of the lure across the surface of the water when the lure reaches the surface.

With these and other objects to be hereinafter set forth in view, I have devised the arrangement of parts to be described and more particularly pointed out in the claim appended hereto.

In the accompanying drawing, wherein an illustrative embodiment of the invention is disclosed, Fig. 1 is a side elevation of a lure or bait constructed in accordance with the invention;

Fig. 2 is a sectional view through the forward end of the lure;

Fig. 3 is a sectional view, taken substantially on the line 3—3 of Fig. 2, looking in the direction of the arrows;

Fig. 4 is a view showing the lure as it appears when being drawn through the water at a relatively slow speed or while remaining substantially stationary, and Fig. 5 shows the lure adjacent to the top of the water and being pulled forwardly at a substantially high rate of speed.

Referring to the drawing, 1 indicates the elongated body of the lure or bait. The body may be made of wood, of plastic, or of other suitable material as commonly employed in lures of this general character. The rear hook is indicated at 2, the same being suspended from the eyelet 3 projecting from the rear end of the body. The belly hook is shown at 4 and this hook is suspended from the eyelet 5 in the under part of the body. The forward or front end surface of the body 1 is inclined downwardly, as indicated at 6, this end being slightly concave, as seen in Fig. 2. An eye 7 is threadably or otherwise secured at the front of the body, and the same receives the line 8.

In the lower part of the body 1, adjacent to the lower end of the inclined front face 6, is a recess 9 in which is located the part 10 of a vane or plate 11. The part 10 extends around a pivot pin 12 on which the plate 11 is thus capable of pivotal or swinging movement. A torsional spring 13 extends around the pivot pin 12, and said spring has one end 14 embedded in the body 1 and its other end 15 inserted under a tongue portion 16 forming a part of the plate 11. This arrangement is such that the spring 13 tends to normally urge the plate forwardly and upwardly to the angular position shown in Fig. 1 and also shown in full lines in Fig. 2. The forward end 17 of the recess 9 constitutes a shoulder or abutment against which the plate 11 abuts, thereby limiting the forward and upward swing of the plate under the urge of the spring 13.

In its forward position, as in Fig. 1, the plate 11 assumes a position close to right angles to the forward, inclined surface 6 of the body 1, and the plate 11 may be slightly dished, as shown, with its convex face directed forwardly.

From the foregoing, the operation of the device will be readily understood. In its normal position, the plate 11 is maintained by the urge of the spring 13 in the position shown in Fig. 1 and as shown in full lines in Fig. 2. When the lure is cast it will descend in the water with the plate 11 remaining in the forward position shown in Fig. 4, and the plate 11 will remain in said position while the lure is being drawn slowly through the water, since a relatively slow movement of the lure through the water may not be sufficient to cause the pressure of the water against the plate to be great enough to overcome the urge of the spring 13. However, as the lure is drawn faster through the water it will, when a predetermined forward movement of it takes place, bring the plate 11 against the water with sufficient pressure to cause the plate to be swung rearwardly in opposition to the urge of the spring and to the position shown in dotted lines in Fig. 2. Such rearward swing of the plate will be limited by the abutment of the plate against the shoulder 18 formed by the rear end wall of the recess 9. When the plate reaches this rearwardly-swung position it will present an upwardly inclined surface to the water and act as a fin or vane to direct the lure upwardly toward the surface of the water. When the lure reaches the surface of the water, as seen in Fig. 4, the tendency of the plate 11 to swing forwardly under the urge of the spring 13 will cause the lure to leap upwardly and out of the water and then descend, and as the plate is forced rearwardly when it again enters and is pulled through the water and then springs forwardly as it reaches the surface of the water, a second skipping action takes place so that the movement of the lure across the surface of the water will be with a series of hops or skips as indicated in dotted lines in Fig. 5. It will be noted that while the lure is submerged and is being pulled through the water and the plate 11 is in its rearwardly-swung position as shown in dotted lines in Fig. 2, the plate 11 and the front inclined surface 6 will be disposed at the same angle and will thus co-operate in the formation of a substantially large inclined elevating surface. As a result, the raising of the lure out of the water is rapid and the skipping action just described rapidly follows each submersion of the lure.

By means of the structure described, it will be apparent that the device will pursue a course both through and on the surface of the water in a manner to attract the fish, thus rendering the device particularly effective as a lure or bait under various fishing conditions.

While I have herein described one embodiment of the invention, it is obvious that the same is not to be restricted thereto, but is broad enough to cover all structures coming within the scope of the annexed claim.

What I claim is:

A fishing lure comprising a body having a blunted forward end defined by a concave surface having the peripheral edges thereof lying in a plane inclined at an angle to the longitudinal center line of the body and sloping downwardly and rearwardly from the top to the bottom of the body, a plate pivoted at one end in said body on a transverse axis lying inwardly of and adjacent the bottom edge of said inclined surface, said plate having an exteriorly extending forward convex surface portion swingable between a first position extending forwardly of, and lying substantially perpendicular to the plane of the edges of said inclined concave surface, and a second position extending downwardly and rearwardly of the body and inclined to the longitudinal axis of the body at the same angle as the plane of the edges of said concave surface, stop means limiting swinging of said plate to said positions, spring means constantly urging said plate toward said first position, and line attaching means on said forward end of said body above said plate, said plate being adapted to swing to said second position in opposition to said spring means by action of the water when the lure is drawn therethrough at a predetermined speed to direct the lure upwardly toward the surface of the water, and adapted to spring forwardly to said first position upon leaving the surface of the water, to provide a skipping action of said lure.

References Cited in the file of this patent
UNITED STATES PATENTS

| | | |
|---|---|---|
| 2,235,331 | Pugh | Mar 18, 1941 |
| 2,437,523 | Hahn | Mar. 9, 1948 |
| 2,455,155 | Baima | Nov. 30, 1948 |
| 2,665,512 | Sullivan et al. | Jan. 12, 1954 |
| 2,666,275 | Smith | Jan. 19, 1954 |